US012785762B2

(12) United States Patent
Rietema et al.

(10) Patent No.: US 12,785,762 B2
(45) Date of Patent: Nov. 3, 2026

(54) LONG RANGE CONTENTION BASED ACCESS PROTOCOL NETWORK

(71) Applicant: PERASO TECHNOLOGIES INC., Toronto (CA)

(72) Inventors: Albert Klaas Theodoor Rietema, Guelph (CA); Ali Reza Khodaian Zavareh, Waterloo (CA); Bradley Robert Lynch, Toronto (CA)

(73) Assignee: PERASO TECHNOLOGIES INC., Toronto (CA)

( * ) Notice: Subject to any disclaimer, the term of this patent is extended or adjusted under 35 U.S.C. 154(b) by 618 days.

(21) Appl. No.: 17/935,323

(22) Filed: Sep. 26, 2022

(65) Prior Publication Data

US 2023/0112373 A1 Apr. 13, 2023

Related U.S. Application Data

(60) Provisional application No. 63/248,151, filed on Sep. 24, 2021.

(51) Int. Cl.
*H04B 7/0426* (2017.01)

(52) U.S. Cl.
CPC .................................... *H04B 7/043* (2013.01)

(58) Field of Classification Search
CPC ........................... H04W 74/0833; H04B 7/043
USPC .......................................................... 370/329
See application file for complete search history.

(56) References Cited

U.S. PATENT DOCUMENTS

| | | | | |
|---|---|---|---|---|
| 8,401,481 B1 * | 3/2013 | Shah | H04W 16/32 455/63.2 |
| 10,812,125 B1 * | 10/2020 | Badic | H04W 72/542 |
| 11,778,533 B2 * | 10/2023 | Ong | H04W 28/021 370/329 |
| 2005/0089001 A1 * | 4/2005 | Nishikawa | H04W 72/569 370/338 |
| 2020/0067565 A1 * | 2/2020 | Yu | H04B 1/71635 |
| 2020/0314904 A1 * | 10/2020 | Fodor | H04B 7/063 |
| 2020/0322996 A1 * | 10/2020 | Wentink | H04W 28/12 |
| 2021/0360430 A1 * | 11/2021 | Reial | H04W 56/001 |

* cited by examiner

*Primary Examiner* — Asad M Nawaz
*Assistant Examiner* — Hugh Mark Ashley
(74) *Attorney, Agent, or Firm* — Perry + Currier Inc.

(57) ABSTRACT

A method in a communication system including an access point and a plurality of stations, includes: selecting, at the access point, a quasi-omni-directional beam for use in transmitting and receiving control frames to and from the stations; selecting, at each station, one of a plurality of directional beams for use in transmitting and receiving control frames to and from the access point; at each of the stations, pausing transmission of Request To Send (RTS) control frames responsive to detecting (i) a RTS control frame from the access point to any one of the stations, or (ii) a Clear to Send (CTS) control frame from the access point to any one of the stations; wherein pausing transmission of RTS control frames is for a duration of time provided in the detected RTS control frame or CTS frame.

14 Claims, 7 Drawing Sheets

LONG RANGE CONTENTION BASED ACCESS PROTOCOL NETWORK

CROSS REFERENCE TO RELATED APPLICATION

The present application claims priority to U.S. Provisional Patent Application Ser. No. 63/248,151, entitled Long Range CBAP And Focused Scanning, filed Sep. 24, 2021, the entire disclosure of which is incorporated herein by reference in its entirety for all purposes.

FIELD

The present application relates in general to wireless networks and communication systems and in particular to systems for avoiding data transmission conflicts using Contention Based Access Protocols in such wireless networks.

BACKGROUND

Contention Based Access Protocols (CBAP) are used to facilitate communication among stations (STA) and access points (AP) in long range fixed-node networks. Specifically, data is only transmitted on the network when it has first been determined that the media is free and clear of signals. As such, each of the various stations and access points must "contend with" (i.e.: "share") the media. Simply put, the various stations and access points must listen to one another to determine when the shared media is in use and when they can each transmit their own data (e.g.: control frames). In these contention-based systems, each of the stations and access points listen first and then, hearing nothing, they talk. To avoid data collisions, the stations and access points must take turns transmitting their data.

In an 802.11ad network, the contention protocol used is called Enhanced Distribution Channel Access (EDCA). EDCA divides data into different groups, giving some groups (such as voice data) priority access to the media over other groups (such as background data). One problem with EDCA (and with other CBAPs in general), is that the stations and access points must all be able to hear one another all of the time. This requirement is especially problematic in long range networks if the stations are both far away from one another and are also far away from some of the access points since a first station may not hear control frames being transmitted by an access point to (or from) a second station. This is commonly known as the "Hidden Node Problem". This Hidden Node Problem becomes more severe when directional beams and dish antennae are involved. Specifically, a first station may simply not hear focused directional communication between an access point and a second station.

During normal communication under the EDCA protocol, an access point sends its Request to Send (RTS) data to a first station (STAx). If a second station (STAy) hears the RTS, the second station STAy will then recognize a time out period for the first station STAx to send its Clear To Send (CTS) acknowledgement to the access point (such that the access point can begin transmitting data frames to the first station STAx). For the EDCA protocol system to operate properly, however, the second station STAy must hear both the RTS from the access point to the first station STAx and the first station's CTS acknowledgement back to the access point AP. If the second station STAy fails to hear either of the RTS or the CTS, it will improperly conclude that the media is open and free for transmission. As such, the second station STAy may attempt a transmission even though the media has already been claimed (for communication between the access point and the first station STAx).

SUMMARY

The present system avoids conflicting transmissions among the various stations and access point in a wireless network, and is ideally suited for use in a network operating on a Contention Based Access Protocol (CBAP). In preferred aspects, conflicts on the network are avoided by having the stations pause their own Requests To Send if they first detect a Request to Send coming from an access point. The stations' Requests To Send are preferably paused for a duration of time given by the access point indicating the duration of time that the access point will be sending their own data. Most preferably, the duration of time given by the access point is included in the control frame's header at the start of the transmission.

In addition, the present system defines a series of alternating time slot in which the stations and the access point can transmit their data (for example, the time slots may be numbered successively, with the stations only transmitting data to the network during even numbered time slots and the access point only transmitting data to the network during the odd numbered time slots, or vice versa).

A further optional inventive feature of the present system is that the stations can be configured to sequentially use a plurality of directional beams (preferably operated in a rotating cycle). As a result, the stations (which may be distributed at distant locations and in different physical directions from the access point) are best able to detect the signals coming from the access point.

An advantage of the present system is that, in contrast to prior existing systems, each of the stations do not need to hear the signals coming from any of the other stations. As such, the present system deals with the "hidden node problem" which occurs when a station can communicate with a wireless access point, but cannot directly communicate with other stations that are communicating with that access point.

Optionally, further systems may be included to ensure that one station's Request To Send data does not always override that of another station. This problem can occur when the stations are placed at different distances to an access point, and send RTS frames in the same contention slot as one another, such that a first station's Request To Send data always reaches the access point before the second station's Request To Send data reaches the access point (for example, when the first station is positioned close to the access point and the second station is positioned far away from the access point). In this situation, the first station will always win the race to communicate with the access point any time these two stations send RTS frames to the access point in the same contention slot.

Therefore, the present system further includes a system and controller that can slightly adjust the time slots at which each of the stations are free to send their Request To Send signals to the access point. In one exemplary method, an offset is applied to the station's assigned time slot, with the offset being correlated to the travel time of the signal through the air to the access point. Simply put, the station that is farther away from the access point may be given an offset that allows it to send its signal slightly earlier than the station that is closer to the access point. As a result, signals sent from the first and second stations would be received by the access point at the same time.

In another exemplary method, slight offset times are applied to all of the stations, e.g., in addition to the air propagation time compensation mentioned above, and these offsets are randomized such that different stations will be given the opportunity to transmit their Requests to Send data at slightly different times, even when selecting the same slot in which to transmit RTS frames. Thus, a station which is positioned farther away from an access point has the same opportunity of eventually being first in line to communicate with that access point. This second approach is particularly well suited for networks having many stations or complex geometries or unusual placement locations for the various stations and access point.

DETAILED DESCRIPTION

Figure 1:
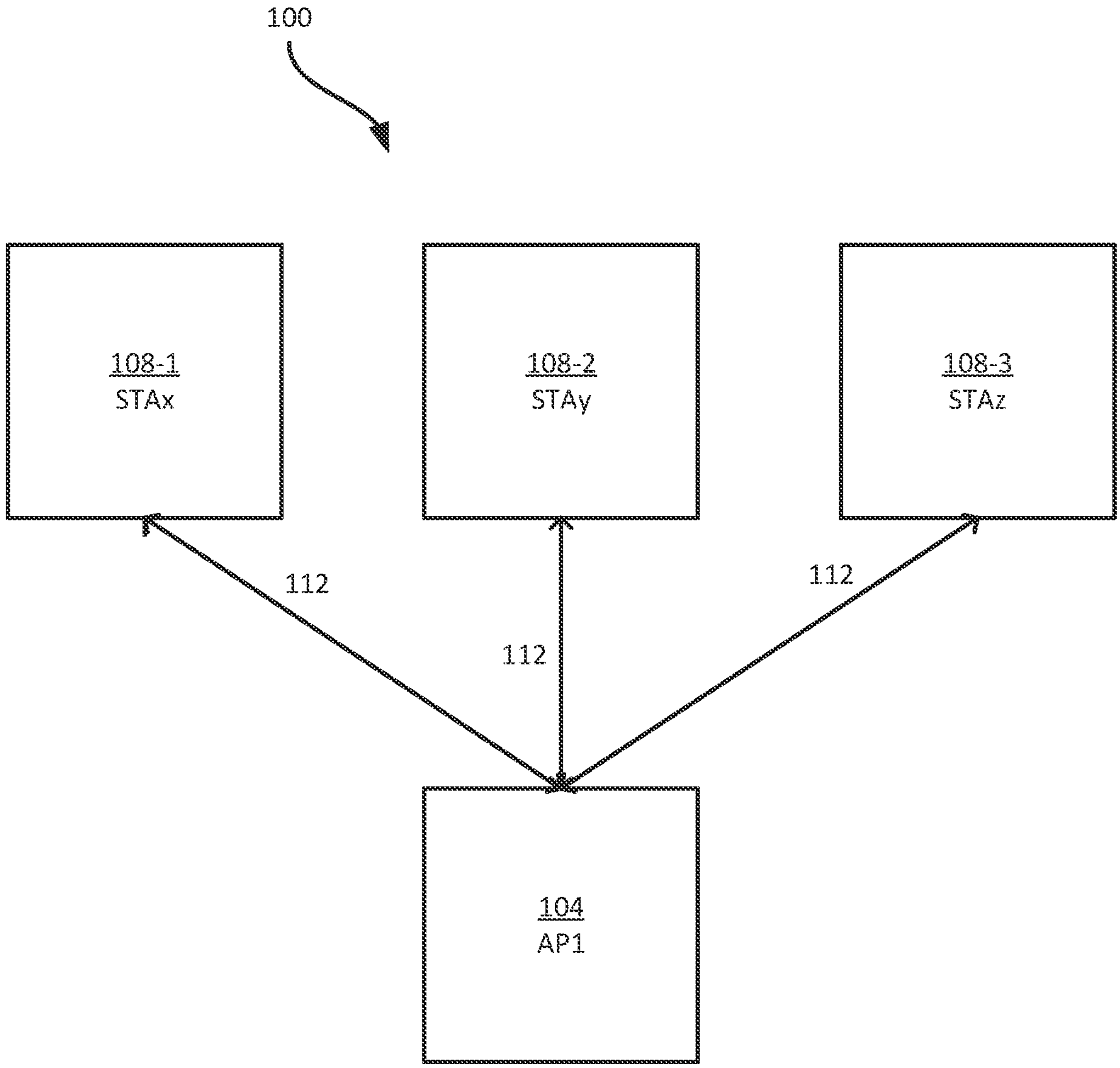
FIG. 1 is a diagram showing an exemplary wireless network having a plurality of stations communicating with an access point.

FIG. 1 illustrates an exemplary wireless network 100 having a plurality of stations 108-1, 108-2, and 108-3 (also referred to as STAx, STAy, STAz) and an access point 104 (also referred to as AP1). The stations may be referred to collectively as stations 108 or stations STAn, and generically as a station 108. The stations 108 and access point 104 are all configured to communicate with one another over network 100, via respective communication links 112. It is to be understood that additional stations 108 may also be included and that the present network 100 is not limited to any particular number of stations.

Figure 2:
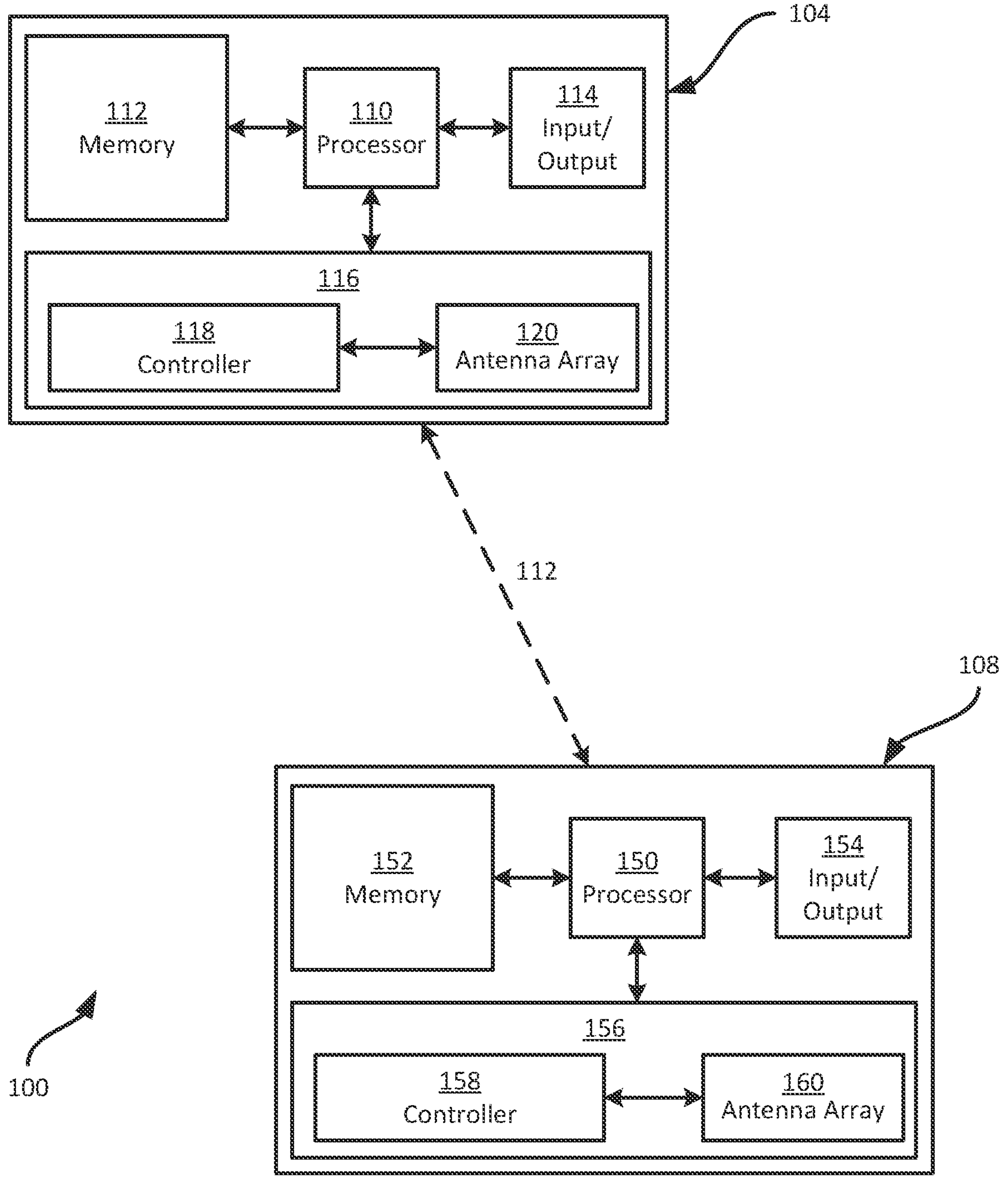
FIG. 2 is a diagram showing exemplary components of the access point and one of the stations of FIG. 1.

FIG. 2 shows example components that may be found in each station 108 and in the access point 104, although it will be understood that the specific selection of components (e.g., makes and/or models of hardware components, device, form factors, and the like), may vary between stations 108. The access point 104 can be, for example, a wireless router connecting the station 108 to a wide area network (not shown) such as the Internet. The access point 104 may also be, for example, a media server, a home computer, a mobile device, and the like. More generally, the access point 104 as referred to herein includes any wireless device implementing point coordinator (PC) functionality.

The station 108, meanwhile, can be a mobile device such as a smartphone, a tablet computer and the like. The station 108 may also be an access point itself, for example in implementations in which the devices 104 and 108 are components in a backhaul infrastructure. More generally, the access point 104 includes any computing device suitable to deploy a wireless local-area network (WLAN). The station

108, meanwhile, includes any computing device suitable to join the above-mentioned WLAN.

The access point 104 and station 108 include respective central processing units (CPU) 110 and 150, also referred to as processors 110 and 150. The processors 110 and 150 are interconnected with respective non-transitory computer readable storage media, such as memories 112 and 152, having stored thereon various computer readable instructions for performing various actions. The memories 112 and 152 each include a suitable combination of volatile (e.g. Random Access Memory or RAM) and non-volatile memory (e.g. read only memory or ROM, Electrically Erasable Programmable Read Only Memory or EEPROM, flash memory). The processors 110 and 150 and the memories 112 and 152 each comprise one or more integrated circuits.

The access point 104 and station 108 also include respective input and output assemblies 114 and 154. The input and output assemblies 114 and 154 serve to receive commands from operators of the devices to control the operation thereof, and to present information, e.g. to the above-mentioned operators. The input and output assemblies 114 and 154 therefore include any suitable combination of keyboards or keypads, mice, displays, touchscreens, speakers, microphones, and the like. In other embodiments, the input and output assemblies 114 and 154 may be connected to the processors 110 and 150 via a network, or may simply be omitted. For example, the access point 104 may omit the input/output assembly 114.

The access point 104 and station 108 further include respective wireless communications assemblies 116 and 156 interconnected with the processors 110 and 150. The assemblies 116 and 156 enable the access point 104 and station 108, respectively, to communicate with other computing devices, including each other. In the present example, the assemblies 116 and 156 enable such communication according to wireless standards employing frequencies of around 60 GHz (also referred to as WiGig) and wide channel bandwidths (e.g. exceeding 1 GHz per channel). Examples of such standards are the IEEE 802.11ad standard, and enhancements thereto (e.g. 802.11ay). The assemblies 116 and 156 can also be configured to enable communications according to a variety of other standards, however, including other members of the 802.11 family of standards.

The communications assemblies 116 and 156 include respective controllers 118 and 158 in the form of one or more integrated circuits, configured to establish and maintain communications links with other devices (e.g., the link 112). The controllers 118 and 158 are configured to process outgoing data for transmission via respective antenna arrays 120 and 160 (e.g. each including a phased array of antenna elements) and to receive incoming transmissions from the arrays 120 and 160 and process the transmissions for communication to the processors 110 and 150.

Figure 3:
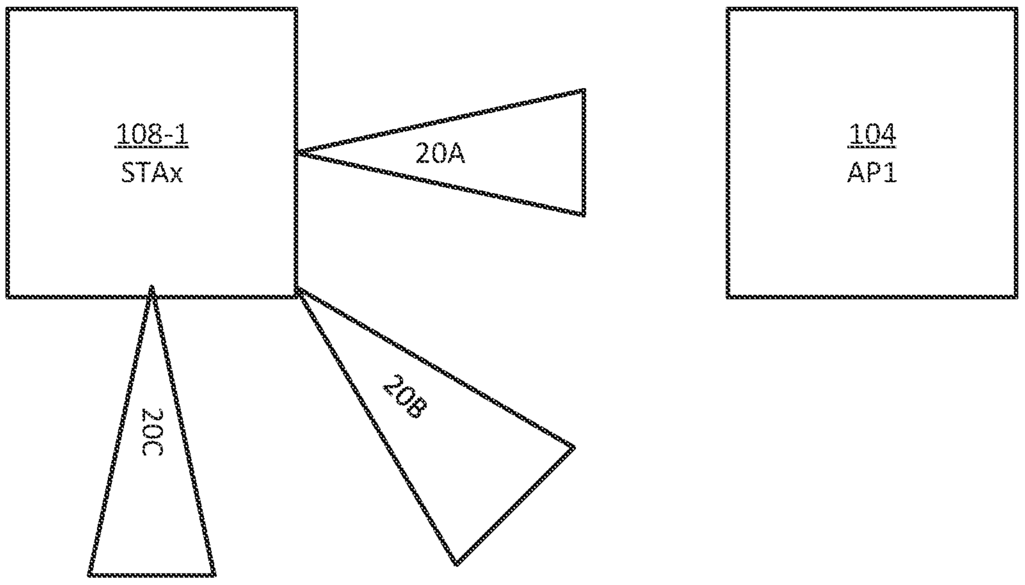
FIG. 3 is an illustration of a station using directional antenna arrays to detect signals from the access point.

FIG. 3 is an illustration of a particular station 108-1 (STAx) using its directional antenna arrays to detect signals from the access point 104. In this example, the access point is configured to transmit and receive control frames using a quasi-omni-directional transmission beam. Station STAx is configured, for example, to cycle through a plurality of directional beams 20A, 20B, 20C, etc. (other directional beams, not illustrated, may also be included) and detect which beam 20 results in the best reception of beacons or other frames from the AP 104. That beam 20 (e.g., the beam 20A in the illustrated example) is subsequently used by the station 108-1 to listen for signals from the AP 104, as well as to transmit signals to the AP 104. Transmission and reception on the directional beams 20A, 20B and 20C can be implemented via control of a phased antenna array as will be apparent to those skilled in the art.

To select an appropriate directional beam for transmitting and receiving data to and from a given AP 104, the station 108-1 can be configured to scan for beacons from the AP 104 using each of a set of available directional beams. For example, the station 108-1 can maintain configuration parameters enabling control of the above-mentioned phased antenna array to implement a number of directional beams. In some examples, the station 108-1 can scan the complete set of beams, and select the beam on which the greatest signal strength was observed from the relevant AP 104. The selected beam can then be used for further transmission and reception to and from that AP 104.

In other examples, the station 108-1 can select a subset of the complete set of available beams over which to scan. For example, the station 108-1, prior to initiating a scan procedure, can obtain a dwell time parameter, e.g., indicating the total time available to complete the scan. The station 108-1 can also obtain a per-beam dwell time, e.g., indicating the time required to complete a scan for a single direction beam. Using the dwell time parameter and the per-beam dwell time, the station 108-1 can determine a number of directional beams that can be scanned within the time period specified by the dwell time parameter. Based on the determined number, the station 108-1 can select the subset of directional beams. For example, the complete set of beams can be prioritized, e.g., such that certain beams are part of a prime subset of beams that is selected for scanning if scanning of the full set cannot be accommodated by the dwell time parameter. The prime subset can include evenly distributed beam angles in some examples, to provide coverage in every direction around the station 108-1, even if at a reduced degree of granularity relative to the complete set of beams. The above process can be repeated, e.g., periodically, for each AP 104 to which the station 108-1 is connected.

A common problem with wireless networks is that the various stations in the network have may trouble detecting signals coming from the access point and directed to other stations, and/or detecting signals from other stations to the access point. When signals coming from the access point and directed to other stations are not detected by all of the stations in the network, data transmission conflicts can arise. This problem is commonly referred to as the “Hidden Node Problem”. The present system advantageously tackles the Hidden Node Problem in several novel ways, as will be explained below.

First, as will be shown, the present system and method can expand a station’s ability to “hear” (i.e.: detect signals from) the access point in the network using directional beam scanning. Specifically, station STAx preferably includes a controller (158 in FIG. 2) that instructs it to rotate through each of its directional beams 20A, 20B, 20C, etc. when listening for signals from the access point. For example, when using a focused direction beam 20A, STAx is most likely to hear access point AP1. It is to be understood that FIG. 3 is a simplification of the actual positions of the station and access point. FIG. 3 is simply meant to illustrate that the physical placement of the access point can affect the ability of a station to hear signals coming from the access point. By sequentially using various direction beams 20A, 20B, 20C, etc., station STAx can thereby effectively listen in different directions such that it can accurately and reliably detect signals coming from the access point 104 at the times when the access point is transmitting signals/beacons.

Figure 4A:
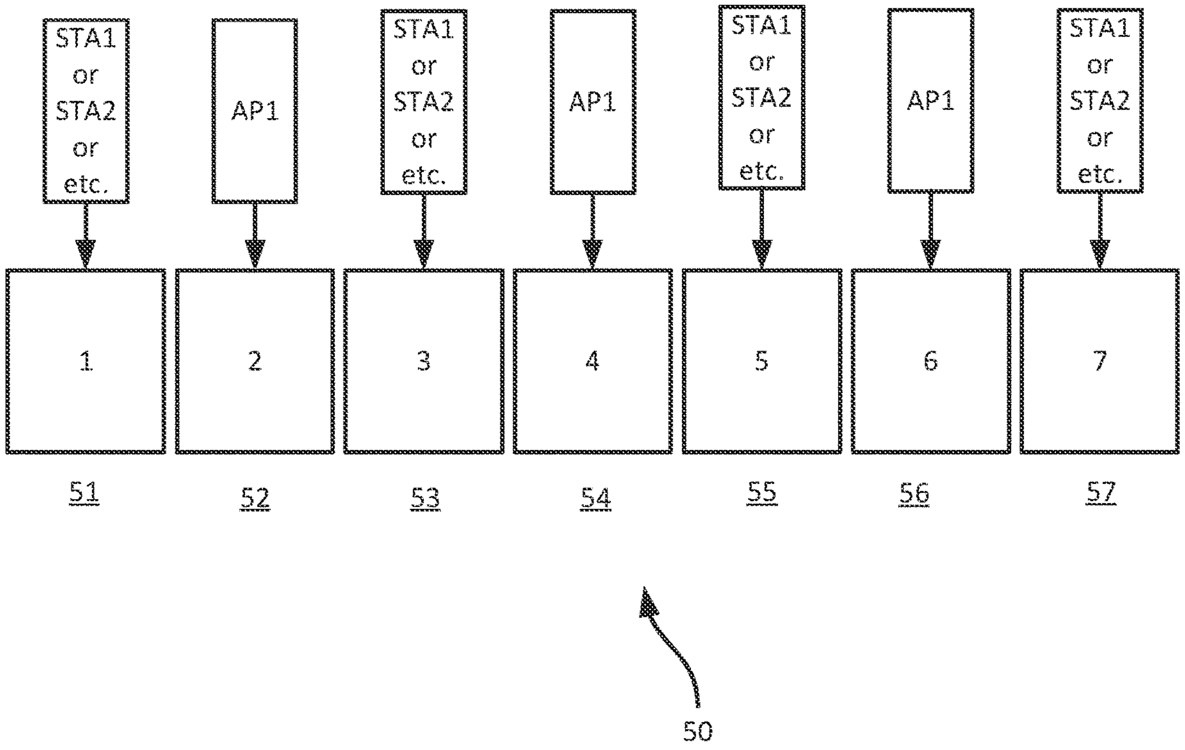
FIG. 4A is an illustration of a series of time slots showing the specific times at which the access point and stations in the network can send their Requests To Send data.

Second, as illustrated in FIG. 4A, the potential for data transmission conflicts to be reduced or eliminated on network 100 can further be achieved by ensuring that stations 108 are only allowed to transmit their signals at a first series of time intervals and the access point 104 is only allowed to transmit its signals at a second series of time intervals. As seen in FIG. 4A, a sequence of time slots 50 may be defined for the network. Time slots 50 can be divided into time intervals 51, 52, 53, 54, 55, etc. with the sequential time intervals occurring one after another.

In accordance with an optional aspect of the present system, even numbered time slots 52, 54, 56, etc. can be used only for the access point 104 to transmit control frames such as Requests To Send (RTS), and the odd numbered time slots 51, 53, 55, 57, etc. can be used only for the various stations 108 to transmit their own control frames (e.g., RTS frames). More specifically, the time slots need not be assigned to any particular station 108. Instead, the time slots 51, 53, 55, 57, for example, can be used by any station 108 to transmit control data. Furthermore, using a particular time slot size in addition to dividing the slots as noted above may enable one station 108, e.g., STAy, to detect a CTS (e.g., at least the preamble thereof) sent by the AP 104 in response to a RTS from STAx, before the next odd-numbered slot. STAy may therefore not send an RTS of its own, as the medium has been claimed. In general, slot size can therefore be selected such that sufficient time passes over two slots to accommodate an RTS frame, interframe spacing, and a CTS preamble, as well as air propagation time for round trip exchanges in the network 100.

Figure 4B:
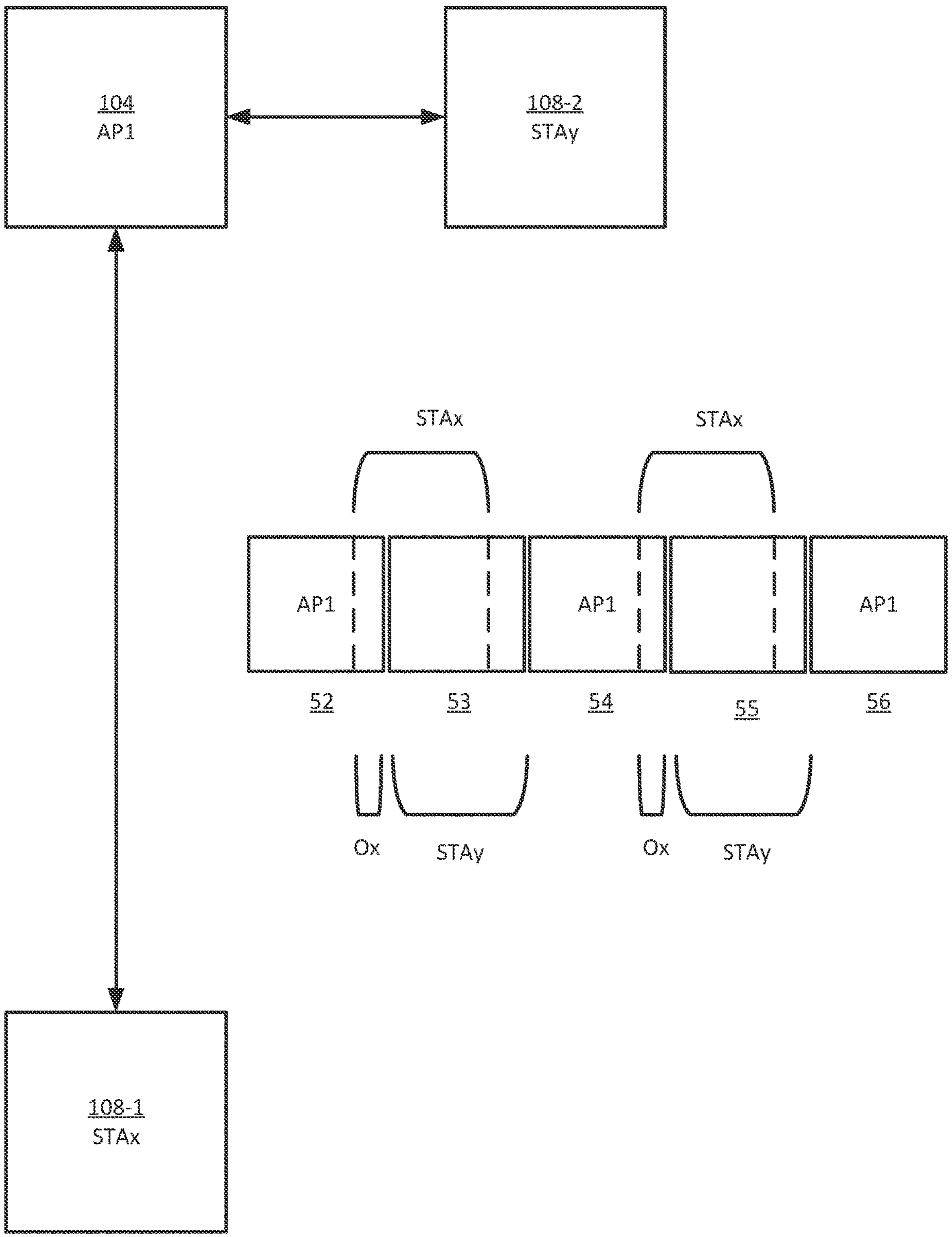
FIG. 4B is an illustration of a time offset being applied to a first station that is further away from an access point than a second station.

Affording the access point 104 certain time slots in which to transmit data or affording all of the stations the same time slots in which to transmit data may still result in unequal access to the transmission medium, however. For example, as shown in FIG. 4B, the station 108-1 (STAx) may be positioned physically farther away from access point 104 (AP1) than a second station 108-2 (STAy). Accordingly, should both stations STAx and STAy randomly choose to transmit their control frames in the same contention slot, e.g., Requests To Send, at time slots 51, 53, etc., STAy will have an advantage since its Request To Send will arrive at access point AP1 first (due to the shorter amount of time that it would take to transmit the signal through the air).

Therefore, in one optional aspect of the present system, a time offset Ox may be applied to station STAx to move the start time of STAx’s time slot earlier such that STAx is permitted to send its Request To Send data to the access point AP1 at a slightly earlier time than STAy. In various approaches, this time offset Ox (i.e.: the slight shift or advance in the STAx’s start time) can either be calculated by STAx or be calculated by AP1. Preferably, this offset Ox will correspond to a defined air propagation time for STAx’s signal. For example, this defined air propagation time can be calculated in direct relation to the physical separation distance between the station and the access point. The greater the physical separation distance, the greater the expected time it would take for the signal to propagate through the air. Simply put, since STAx’s signal to AP1 will always take a slightly longer amount of time to reach AP1 than a signal coming from STAy, time offset Ox will give STAx a slight head start. As a result, STAx and STAy will have generally equal and fair access to AP1. Propagation time can be measured via a measurement of round-trip time (RTT) between STAx and AP1, for example, following which STAx can calculate Ox, e.g., proportional to the RTT.

Again, it is to be understood that the illustration of FIG. 4B is merely exemplary in only showing two stations STAx and STAy. In normal operation, any number of additional stations may be added. Some or all of these stations may be given time offsets such that stations that are located more distant may be allowed to send signals earlier to thus provide a network with fair access for the various stations.

It will also be understood that (following the above example) adding more stations 108 to the network 100 located at different physical locations may place some stations closer to the access point 104 than others, or farther away from the access point. Compensating for air propagation may lead to RTS or other control frames arriving from stations 108 at the AP 104 at almost exactly the same time. However, whichever RTS arrives first (e.g., even one clock cycle prior to other RTS frames) is processed first by the AP 104. Certain stations 108 may therefore nevertheless be disadvantaged relative to others, based on small variations in processor clock timing at each station 108. Therefore, another optional system of time offsets to supplement air propagation compensation is also provided, as follows.

Figure 4C:
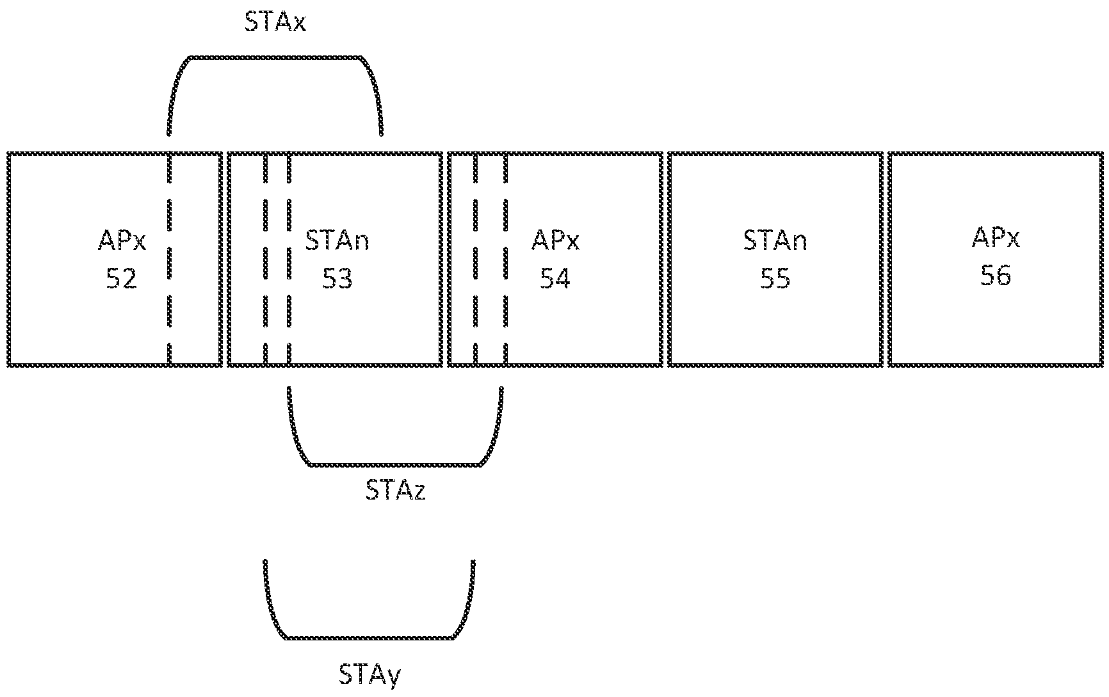
FIG. 4C is an illustration of a random time offset being applied to a plurality of stations.

FIG. 4C illustrates time slot access when a randomized start offset time is applied to each of the plurality of stations 108. This start offset time may result in an earlier or later start time for the time slots for each of the stations. These randomized offsets may be calculated by the stations themselves, the access point 104, or some combination thereof. Specifically, a first station STAx may be given a first offset time, a second station STAy may be given a second offset time, a third station STAz may be given a third offset time, etc. These offset times are randomized and typically small compared with air propagation compensation offsets (e.g., up to fifty clock ticks, or generally less than one microsecond). The stations 108 are therefore given access to the network at slightly different times. For example, at one time, station STAx will have the advantage, and at another time station STAx will have the disadvantage when competing with other stations having randomly chosen the same contention slot. In the illustrated example of FIG. 4C, the station STAx is given an offset such that it can transmit earliest, station STAy will have a slight delay and station STAz will have an even longer delay. The next time around, the various stations can all be assigned new randomized offset times. An advantage of this approach is that it addresses the fact that the various stations may each operate with internal clocks that have slightly different speeds.

By continually changing the time offsets for the different stations, no one station 108 can secure a consistent advantage over any of the other stations 108 in terms of priority accessing the network. It is to be understood that this approach of giving each of the stations their own random time offsets to adjust their own time access slots may be applied to some or all of the various stations 108 in the network, as is desired. Thus, the present approach of applying a random time offset for each of the station's access to the network is understood to encompass applying randomized offset times to some or all of the stations and at some or all of the time slots. Moreover, it is preferred that such individual time offsets be continuously randomized such that any particular station will have a lead time (compared to the other stations) some of the time, and a delay time (compared to the other stations) at other times. By randomizing (and later re-randomizing) the offsets for the various stations, no one station will get priority access over another station, thereby keeping network access "fair".

Figure 5:
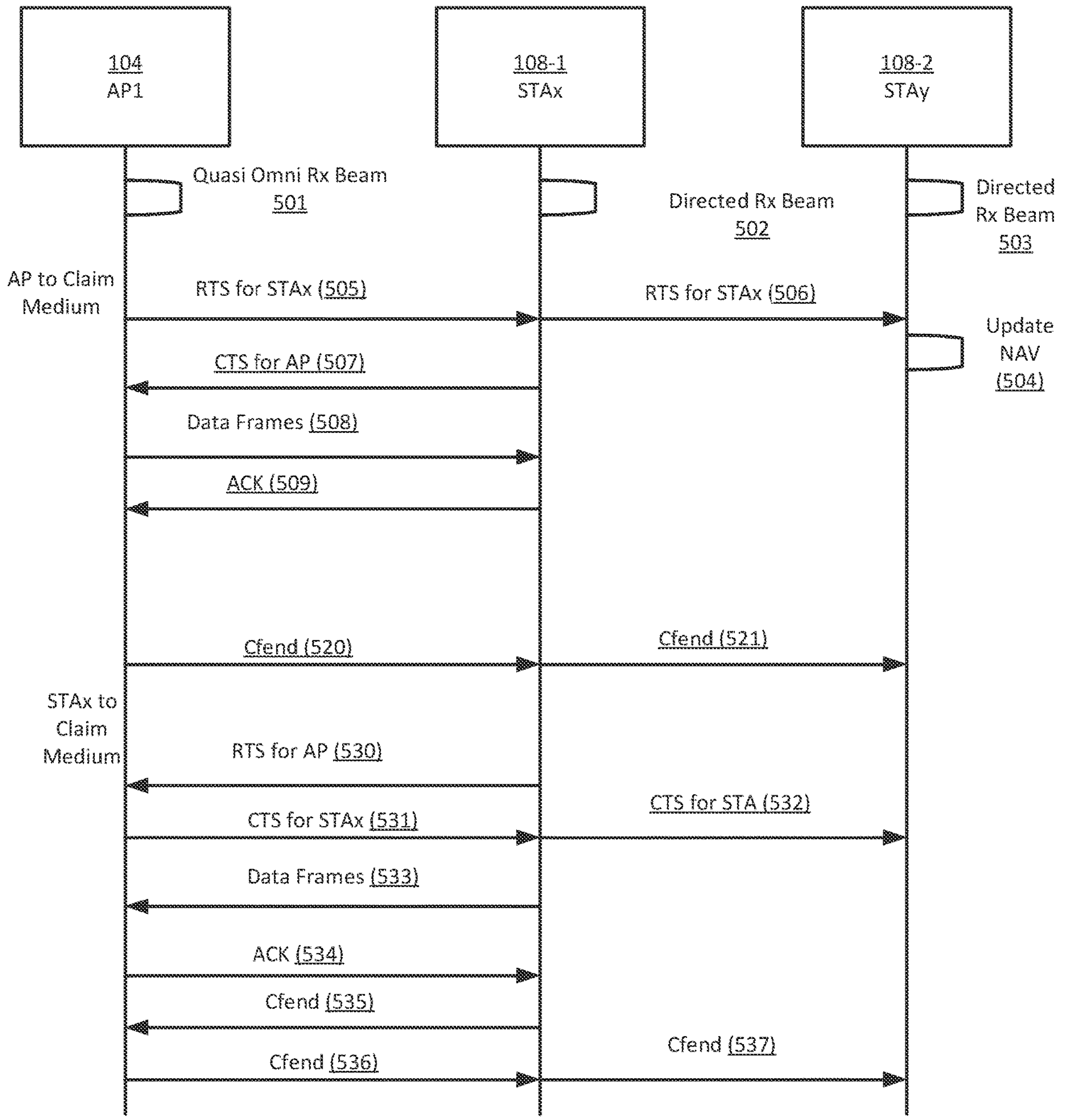
FIG. 5 is a flowchart of a preferred method of system operation.

FIG. 5 illustrates a preferred method 500 of avoiding conflicting data transmissions in a network having an exemplary access point AP1 and a plurality of stations STAx and STAy. It is to be understood that in actual system operation, many more stations may be included in the network. The network preferably operates on a Contention Based Access Protocol, which may include an EDCA protocol. As was explained above, access point AP1 is preferably configured to transmit and receive control frames using a quasi-omni-directional transmission beam at 501 (rather than directional beams selected for optimal transmission to specific stations 108, as in prior art systems), and stations STAx and STAy are configured to employ directional beams, e.g., selected as noted earlier, to transmit and receive control frames at 502 and 503, respectively (rather than receiving control frames using quasi-omni beams, as in prior art systems). At blocks 501, 502 and 503, the access point and two stations are effectively just "listening". More generally, as will be discussed below, the AP 104 transmits and receives control frames using the quasi-omni beam, although the AP 104 can use targeted beams to exchange data frames with individual stations 108 (e.g., once the medium is secured for such exchange). The stations 108, meanwhile, use targeted beams to send and receive both control and data frames with the AP 104.

Next, in the illustrated example, access point AP1 wishes to claim access to the media. Accordingly, access point AP1 sends a Request to Send control frame to station STAx at block 505. This Request to Send is sent via quasi-omni transmission beam Tx. Station STAy hears this request at block 506. This occurs because AP1 is transmitting in quasi-omni, rather than as a directed beam towards STAx, and because STAy is listening on a directional beam selected for optimal reception from AP1, rather than on a quasi-omni beam. Next, STAy is configured to assume the medium is taken when it hears the Request to Send from AP1 (rather than waiting to hear STAx's subsequent Clear To Send (CTS) frame). Any station 108 (e.g., STAy) detecting that another device has claimed the transmission medium is configured to pause (e.g., interrupt) their own transmission of RTS frames or other control frames until the claimed period expires. At this time, STAy is configured to set a local Network Allocation Vector (NAV) or other access-tracking data structure to the duration claimed in the Request To Send from AP1, at block 504. Next, station STAx sends a Clear To Send frame to access point AP1 at 507. Access point AP then transmits its data (frames) to station STAx at 508 using a Tx beam optimally directed to STAx. After receiving these data frames, station STAx will then send an acknowledgement at 509. The acknowledgement sent by STAx can also be sent using a directed beam, e.g., the beam 20A shown in FIG. 3.

In the event that the data sent by the access point takes less time to transmit than the amount of time in its Transmission Opportunity (i.e.: the period of time that was initially allotted for the access point to transmit the control frame data to the stations), then the access point AP1 can send a Contention Free End (CFEnd) signal, using the quasi-omni beam (to ensure all stations 108 hear the CFEnd frame). The CFEnd frame is received by station STAx at 520, and by station STAy at 521. The Contention Free End frame indicates that unused time remains in the Transmission Opportunity. The CFEnd frame can contain, for example, an indicator of the amount of time remaining until the medium becomes idle (i.e., free for contention). For example, if the duration indicated in the CFEnd frame is zero, the medium is free for contention immediately following the CFEnd frame. Because the CFEnd frame is transmitted using a quasi-omni beam by the AP1, the stations STAx and STAy (which are listening using directed beams selected for optimal data exchange with AP1) both detect the CFEnd frame, and thus can both can begin sending Requests To Send if they themselves want access to the media.

Next, following along in this illustrated example, station STAx now wishes to claim access to the media. At this time, station STAx will send its Request To Send frame to the access point AP1 at 530. The use of a directional beam selected for optimal exchanges with the AP1 by the STAx means that the STAy is unlikely to detect the RTS sent by the STAx. The access point AP1, however, sends a Clear To Send (CTS) frame using a quasi-omni beam to station STAx at 531. Use of quasi-omni transmission by the AP1 increases the likelihood that the station STAy detects the CTS frame at 532. STAx will then begin transmitting data to the access point AP1 at 533. Once the access point AP1 has received the data, the access point AP1 will then send an acknowledgement back to station STAx at 534.

In the event that the data sent by STAx takes less time than to transmit than the amount of time in its Transmission Opportunity (i.e.: the period of time that was initially claimed for data transmissions by STAx), then the STAx can send a Contention Free End (CFEnd) frame to the access point AP1 at 535, using the previously selected directional beam. As noted above, the CFEnd frame serves to release the transmission medium for use by stations other than STAx The access point AP1, upon receipt of the CFEnd frame from STAx, can determine whether to relay the CFEnd frame, e.g., by transmitting copies of the CFEnd frame using a quasi-omni beam, such that other stations 108 (e.g., STAy) can receive the CFEnd frame. As will be apparent, the CFEnd frame sent at 535 is unlikely to be heard by STAy, due to the use of a directional beam by STAx. AP1 can, for example, determine whether the remaining time in the transmission opportunity (TxOP) time period (i.e., the time being released by STAx) is greater than a predetermined threshold. When the determination is affirmative, AP1 can relay the CFEnd frame (with an updated time remaining in the TxOp duration) from STAx using the quasi-omni beam, enabling STAx to detect the CFEnd frame at step 536, and enabling STAy to detect the CFEnd frame at step 537. When the determination is negative (i.e., when the time being released by STAx is less than the threshold), AP1 can omit relaying of the CFEnd frame, as STAy will assume the transmission medium is free once the originally claimed period expires.

The scope of the claims should not be limited by the embodiments set forth in the above examples, but should be given the broadest interpretation consistent with the description as a whole.

The invention claimed is:

1. A method in a communication system including an access point and a plurality of stations, the method comprising:

selecting, at the access point, a quasi-omni-directional beam for use in transmitting and receiving control frames to and from the stations;

selecting, at each station, one of a plurality of directional beams for use in transmitting and receiving control frames to and from the access point;

transmitting, from the access point to one of the stations using the quasi-omni-directional beam, a Request To Send (RTS) control frame;

at each of the stations, pausing transmission of RTS control frames responsive to detecting the RTS control frame transmitted from the access point using the quasi-omni-directional beam to any one of the stations;

wherein pausing transmission of RTS control frames at each of the stations is for a duration of time provided in the detected RTS control frame from the access point.

2. The method of claim 1, further comprising:

applying a randomized start offset time to each of the plurality of stations such that each station transmits RTS control frames at times offset from a defined first set of time slots.

3. The method of claim 1, further comprising:

applying a start time offset to each of the plurality of stations, wherein the start time offset corresponds to a defined air propagation time for each station.

4. The method of claim 1, further comprising:

sending, from the access point using the selected quasi-omni-directional beam, a Contention Free End (CFEnd) control frame to one of the stations when unused time remains in a period of time allotted for the access point to transmit data to the stations; and detecting, at the remaining stations, the CFEnd control frame.

5. The method of claim 1, further comprising:

sending, from a first one of the stations following completion of a data exchange between the first station and the access point, a Contention Free End (CFEnd) control frame to the access point using the selected directional beam, the CFEnd control frame indicating time remaining until transmission medium is free for contention; and at the access point, relaying the CFEnd control frame using the selected quasi-omni-directional beam.

6. The method of claim 5, further comprising:

at the access point, prior to relaying the CFEnd control frame, determining whether the unused time exceeds a threshold.

7. The method of claim 1, further comprising:

at each station, selecting the one of the plurality of directional beams by: obtaining a dwell time parameter;

selecting a subset of the plurality of directional beams based on the dwell time parameter; and scanning each of the selected subset.

8. A network, comprising:

an access point configured to: (i) select a quasi-omni-directional beam for use in transmitting and receiving control frames, and (ii) transmit, to one of the stations using the quasi-omni-directional beam, a Request To Send (RTS) control frame; and a plurality of stations, each station configured to select one of a plurality of directional beams for use in transmitting and receiving control frames to and from the access point;

a station controller at each station, the station controller configured to:

pause transmission of RTS control frames responsive to detecting the RTS control frame transmitted from the access point to any one of the stations, or (ii) a Clear to Send (CTS) control frame from the access point using the quasi-omni-directional beam to any one of the stations, wherein the pause is for a duration of time provided in the detected RTS control frame from the access point.

9. The network of claim 8, wherein each station controller is further configured to apply a randomized start offset time such that the corresponding station transmits RTS control frames at times offset from a defined first set of time slots.

10. The network of claim 8, wherein each station controller is further configured to apply a start time offset corresponding to a defined air propagation time for the corresponding station.

11. The network of claim 8, wherein the access point is further configured to:

send, using the selected quasi-omni-directional beam, a Contention Free End (CFEnd) control frame to one of the stations when unused time remains in a period of time allotted for the access point to transmit data to the stations; and wherein each of the remaining stations is configured to detect the CFEnd control frame.

12. The network of claim 8, wherein a first one of the stations is configured to:

send, following completion of a data exchange between the first station and the access point, a Contention Free End (CFEnd) control frame to the access point using the selected directional beam, the CFEnd control frame indicating time remaining until transmission medium is free for contention; and wherein the access point is further configured to, relay the CFEnd control frame using the selected quasi-omni-directional beam.

13. The network of claim 12, wherein the access point is further configured, prior to relaying the CFEnd control frame, to determine whether the remaining time exceeds a threshold.

14. The network of claim 8, wherein each station controller is configured to select the one of the plurality of directional beams by:

obtaining a dwell time parameter;

selecting a subset of the plurality of directional beams based on the dwell time parameter; and scanning each of the selected subset of directional beams.

* * * * *